US008416795B2

(12) United States Patent
Thyni

(10) Patent No.: US 8,416,795 B2
(45) Date of Patent: *Apr. 9, 2013

(54) ETHERNET SWITCHING

(75) Inventor: Tomas Thyni, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,475

(22) Filed: May 24, 2012

(65) Prior Publication Data

US 2012/0230346 A1 Sep. 13, 2012

Related U.S. Application Data

(63) Continuation of application No. 12/439,588, filed as application No. PCT/SE2006/050310 on Sep. 4, 2006, now Pat. No. 8,208,483.

(51) Int. Cl.
*H04L 12/28* (2006.01)

(52) U.S. Cl. .... 370/417; 370/412; 370/392; 370/395.31

(58) Field of Classification Search ........................ None
See application file for complete search history.

(56) References Cited

U.S. PATENT DOCUMENTS

| | | | | |
|---|---|---|---|---|
| 2007/0258445 | A1 * | 11/2007 | Smith et al. | 370/389 |
| 2007/0291656 | A1 * | 12/2007 | Knazik et al. | 370/252 |
| 2007/0291751 | A1 * | 12/2007 | Smith et al. | 370/389 |

* cited by examiner

*Primary Examiner* — Jay P Patel

(57) ABSTRACT

A scheduler in an Ethernet switch and method for scheduling and queuing received unicast packets. The scheduler determines a destination address and a traffic priority of a received packet, and searches for a stored association between the destination address and an interfacing port of the Ethernet switch. When a stored association is found, the received packet is scheduled and queued in one of the priority buffers of the output buffer in an associated interfacing port according to the received packet's traffic priority. When no association is found, the scheduler floods the received unicast packet in a flooding buffer in every interfacing outgoing port of the Ethernet switch. The flooded packet may be scheduled as low priority traffic, or may be prioritized in relation to other flooded unicast packets based on each flooded unicast packet's traffic priority.

15 Claims, 6 Drawing Sheets

ETHERNET SWITCHING

RELATED APPLICATIONS

This application is a continuation of U.S. patent application Ser. No. 12/439,588 filed Mar. 2, 2009, now U.S. Pat. No. 8,208,483 which is a 371 of International Application No. PCT/SE06/50310, filed Sep. 4, 2006, the disclosures of which are fully incorporated herein by reference.

TECHNICAL FIELD

The present invention relates to a method in an Ethernet switch, and to an Ethernet switch provided with an arrangement, for handling received Ethernet unicast packets, and in particular for handling received Ethernet unicast packets having a destination address that is unknown to the switch.

BACKGROUND

Various communication devices are available today that are capable of packet-based multimedia communication using the IP (Internet Protocol), e.g. fixed or mobile computers and telephones, and multimedia services typically use IP-based transmission of encoded data representing media content, such as e.g. video, audio and text.

IP-TV (Internet Protocol TeleVision) distributes television/video content to a customer/subscriber over a broadband connection, and the content is preferably received by a set-top box connected to a television display, which may be located in the home of the customer/subscriber.

In conventional cable television, all available channels are delivered simultaneously to each subscriber, creating limitations regarding the number of channels and contributing to bandwidth shortages and quality degradation. In IP-TV, on the contrary, only the requested content is transmitted to the viewer's set-top box when a viewer changes the channel or selects a program. IP-TV provides a high picture quality, as well as sound quality, and allows interactivity and viewing "on-demand" of user-selected content.

Standard IP-TV requires a transmission bit-rate of 5-6 Megabit per second and HD IP-TV requires 12-20 Megabit per second. Advantageously, the distribution involves the use of Ethernet, preferably Gigabit Ethernet (GbE) or 10 Gigabit Ethernet (10 GbE), supporting data transfer bit rates of 1 Gigabit per second or 10 Gigabit per second, respectively. Ethernet is the most widely used LAN-standard today, involving a switched layer-2 network standard for connecting several communication devices on a common bus, which may form a segment. Several segments may be connected to one Ethernet switch to form a suitable network topology, e.g. a tree, and Ethernet switches may be interconnected e.g. in a ring topology, thereby connecting a very large number of communication devices in an Ethernet network.

The traffic is transported with up to eight different priorities regarding the QoS (Quality of Service), and the priority is indicated in a CoS (Class of Service) field in the Ethernet packet. The Ethernet packets are formed by a protocol called MAC (Medium Access Control), which encapsulates the payload data by adding a header before the data, the header comprising the destination address and a source address.

An Ethernet network uses two addresses to identify the source and the destination of each packet of data, and the addresses are commonly referred to as MAC-addresses, which are unique for each device. The destination address may specify either a single receiver device or receiver node (unicast), a group of receiver devices (multicast), or the set of all receiver devices (broadcast).

In unicast transmission in a LAN, a packet is sent from a single source to one specified single destination within the LAN, and in broadcast transmission, a packet is sent from one source to a destination that is a set of all devices connected to the LAN. In multicast transmission, a packet is sent from a source that is a set of one or more devices, and to a destination that is a set of one or more devices connected to the LAN. Thus, multicasting denotes a networking technique of delivering the same packet simultaneously to a selected group of clients. Unlike broadcast transmission, a device will receive a multicast transmission only if it belongs to a specific multicast address, and the membership of a multicast group may be dynamic. The destination address in an Ethernet packet indicates if the packet is a broadcast packet to be sent to all connected devices, or a multicast packet to be sent only to a selected group of devices.

An Ethernet switch is a bridge between two or more segments of the Ethernet LAN, the switch having two or more interfacing ports, and unlike a hub it is capable of forwarding a received data packet to only the required port or ports. Thereby, the switch is able to reduce the number of packets on the different segments of the Ethernet LAN, and the load on the segments, increasing the overall performance, as well as reducing the risk of observation by an unauthorised computer connected to a segment of the LAN.

When the switch receives an Ethernet packet through a port, it examines the source address in the header of the packet and records on which port it was received, learning the MAC addresses of the devices connected via each port. The associations between MAC-addresses and the interfacing ports of the switch are stored in a MAC-table located in the switch. Thus, the Ethernet switch learns to associate a MAC address to a specific port and stores the association in a MAC table, and this procedure is commonly denoted MAC learning. However, a stored association is normally deleted from the MAC table after a certain time-out interval.

When a packet is received, the switch also examines the destination address, and scans the MAC table to find the MAC address of the destination address, to see if any association to an interfacing port is stored, e.g. due to a packet having been received earlier from a source address having the same MAC address as the destination address.

If the header indicates a broadcast destination, the packet is transmitted through all output ports of the switch, except the incoming port.

If the header indicates a unicast destination, and the MAC address is found in the MAC table and the address is not associated with the port through which it was received, i.e. the incoming port, the switch forwards the packet to the port associated with this MAC address.

If the header indicates a unicast destination, and the MAC address of the destination address is found in the MAC table, but this address is associated with the incoming port, i.e. the port through which the packet was received, the packet is discarded, since it must already have been received by devices connected to the incoming port.

However, if the header indicates a unicast destination and the MAC address is not found in the MAC table, the location of the destination device is unknown to the switch. The location of the destination device will be unknown to the switch when no packets have been received from the destination device before, or when the MAC address of the destination device has been deleted, e.g. due to a recent restart or a lapsed time-out interval of the MAC table. Since the switch can not find the MAC address in the MAC table, it is unable to determine the port to which the destination device is connected. Therefore, the switch will "broadcast" the packet by sending it through all outgoing ports of the switch, but not trough the incoming port, since the devices connected to this segment of the LAN already must have received the packet. The procedure that the switch transmits a unicast packet having an unknown destination address through all outgoing ports is conventionally referred to as flooding, or unicast flooding. It allows a fast delivery of packets to their destination even the MAC address is unknown to one or more of switches in the LAN, but the drawback is that is consumes more resources.

Thus, the occurrence of unicast flooding is normal, but due to certain events a larger number of packets will be flooded, which may affect the network performance. Such an event may e.g. be a change of the topology due to an addition or a removal of a switch, a link failure, a configuration change of the LAN, or a hardware replacement, and when the topology changes, the stored associations between the MAC addresses and the ports are no longer relevant. Consequently, the switch has to delete all the entries in the MAC table in order do minimize misdirected packets. After a flushing, e.g. a deletion, of the MAC table, the MAC address of the destination of a received packet will be unknown to the switch, and the packet will be "broadcasted" through all the ports, except the incoming port. However, the switch will examine the header of the received packet, determine the source address, and add the association between the MAC address of the source and the incoming port as a new entry in the MAC table, and eventually an updated MAC table will be created.

If multiple paths exist to the same destination in the LAN, and a packet has an unknown destination, flooding would cause the packet to be sent back to the original switch. The Spanning Tree Protocol is designed to prevent loops in the network by blocking redundant paths and ensuring that only one active path exists between every two switches in the network. This is performed by means of bridge protocol data units (BPDUs) identifying paths, i.e. ports, to be blocked. The Spanning Tree Protocol (STP) will reduce the time-out interval of the MAC table in the event of a topology change, and this will increase the occurrence of unknown destination addresses, and cause flooding of the outgoing ports by the received unicast packets. According to the Rapid Spanning Tree Protocol (RSTP), the MAC table will be flushed immediately when the topology changes, which will lead to flooding of received unicast packets, until new entries have been added to the MAC table.

Another commonly used Ethernet protocol is Ethernet Automatic Protection Switching (EAPS), providing an Ethernet ring topology of interconnected Ethernet switches, each switch connecting segments of communication devices. The EAPS provides a fast recovery mechanism when a link failure occurs in the Ethernet ring, with no limitation in the number of nodes in the ring, but a link failure involves flushing of MAC tables, leading to flooding of the switches.

The flooding of unicast packets having unknown MAC addresses will cause excessive overload of the comparatively small downlink ports, thereby leading to a delay or drop of the data traffic that is destined for any of the overloaded downlink ports.

An Ethernet switch receives traffic with different traffic priority regarding the Quality of Service indicated by the Ethernet Class of Service (P-bit) in a received Ethernet packet, or by the IP Class of Service. The traffic is normally scheduled and queued logically in different output priority buffers in the outgoing interfacing ports based on the Class of Service-setting for each packet, and this is also true when the MAC-address is unknown to a switch. Therefore, flooded high-priority traffic will be transported with high priority through every output port of the switch, leading to overload, and to lost and dropped packets.

The consequences of the flooding will be larger when the Ethernet is used for transporting high-priority data traffic, such as IP-TV, VoIP and games. When a failure affects high-priority traffic, the traffic will be flooded on many ports without any receivers, resulting in packet drops in the low-priority traffic, as well as in the high-priority traffic, due to the excessive traffic during the flooding phase Thus, the flooding of unicast packets presents a problem in Ethernet networks, especially with the high bit-rates of 10 Gigabit Ethernet and Gigabit Ethernet used in connection with e.g. the EAPS and RSTP in multimedia transmission, such as IP-TV and VoIP, leading to disturbances in the transfer of the multimedia content.

SUMMARY

The object of the present invention is to address the problems outlined above, and to provide efficient handling of received Ethernet unicast packets having a destination address that is unknown to the switch, thereby reducing the transmission losses caused by flooding. This object and others are achieved by the method in an Ethernet switch, and the Ethernet switch, according to the appended independent claims.

According to one aspect, a method in an Ethernet switch is provided for handling received Ethernet unicast packets, the switch having two or more interfacing ports, and each port provided with an output buffer logically divided into different priority buffers. The method comprises the following steps:

A determination of the destination address and the traffic priority of a received unicast packet;

A search for a stored association between said destination address and an interfacing port of the switch;

If an association is found, the packet is scheduled and queued in one of said priority buffers of the output buffer in the associated interfacing port according to its traffic priority;

If no association is found, the packet is flooded by queuing the packet in a pre-determined flooding buffer in every interfacing outgoing port of the switch, wherein the traffic in said flooding buffer is scheduled as low-priority traffic.

The traffic in said flooding buffer may be scheduled with the lowest traffic priority.

The packet may be queued in one of the logically separate priority flooding buffers in said flooding buffer according to its traffic priority, and said traffic priority may correspond to the priority indicated by the Ethernet Class of Service (CoS) in the Ethernet packet.

The destination address in said Ethernet packet may indicate the MAC address of the destination device of the packet, and the association between said MAC address and an interfacing port may be stored in a MAC table in the switch.

The flooding of a unicast packet received through an incoming port of the switch may involve transmission through every interfacing port of the switch, except through said incoming port.

According to another aspect, an Ethernet switch has two or more interfacing ports, each provided with an output buffer logically divided into different priority buffers, and the switch is provided with an arrangement for handling received unicast packets, said arrangement comprising:

A determination unit for determining the destination address and the traffic priority of a received unicast packet;

A search unit for finding a stored association between said destination address and an interfacing port of the switch;

A scheduling unit for scheduling and queuing the packet in one of the priority buffers of the output buffer in an associated interfacing port according to its traffic priority, and for queuing a received unicast packet, for which no stored association is found, in a pre-determined flooding buffer in every interfacing outgoing port of the switch, wherein the traffic in said flooding buffer is scheduled as low-priority traffic.

The traffic in the flooding buffer may be scheduled with the lowest priority.

The flooding buffer may be further logically divided into different priority flooding buffers for scheduling and queuing the flooding unicast packets according to their traffic priority, and said traffic priority may correspond to the priority indicated by the Ethernet Class of Service (CoS) in the Ethernet packet.

The destination address in said Ethernet packet may indicate the MAC address of the destination device of the packet, and the switch may comprise a MAC table for storing the associations between said MAC address and an interfacing port.

The scheduling unit may be arranged to transmit a unicast packet received through and incoming port, and for which no association with the destination address is stored, through every interfacing port of the switch, except through said incoming port.

BRIEF DESCRIPTION OF THE DRAWINGS

The present invention will now be described in more detail and with reference to the accompanying drawings, in which.

DETAILED DESCRIPTION

In the following description, specific details are set forth, such as particular sequences of steps and device configurations in order to provide a thorough understanding of the present invention. However, it is apparent to a person skilled in the art that the present invention may be practised in other embodiments that may depart from these specific details.

Moreover, it is apparent that the described functions may be implemented using software functioning in conjunction with a programmed microprocessor or a general purpose computer, and/or using an application specific integrated circuit. While the invention is described in the form of a method and a device, the invention may also be embodied in a computer program product, as well as in a system comprising a computer processor and a memory, wherein the memory is encoded with one or more programs that may perform the described functions.

When the destination address of a received Ethernet packet is unknown to a switch, the packet will be flooded through every output port of the switch. If the received packet has a high traffic priority regarding the Quality of Service, the packet will be transported with high priority through every output port of the switch, leading to overload, and to lost and dropped packets. The present invention solves the above-described problem by queuing the flooded traffic as low-priority traffic, or with the lowest priority, regardless of the actual Class of Service indicated in the packet. Thereby, a reduced degradation due to flooding of packets having unknown MAC addresses will be achieved.

According to a further embodiment of this invention, the flooded low-priority packets are prioritized in relation to each other based on the Class of Service setting, thereby achieving a flooding priority. This will have no impact on other traffic, but will result in less interruption of the high-priority traffic that is directly affected by a link failure.

Figure 1:
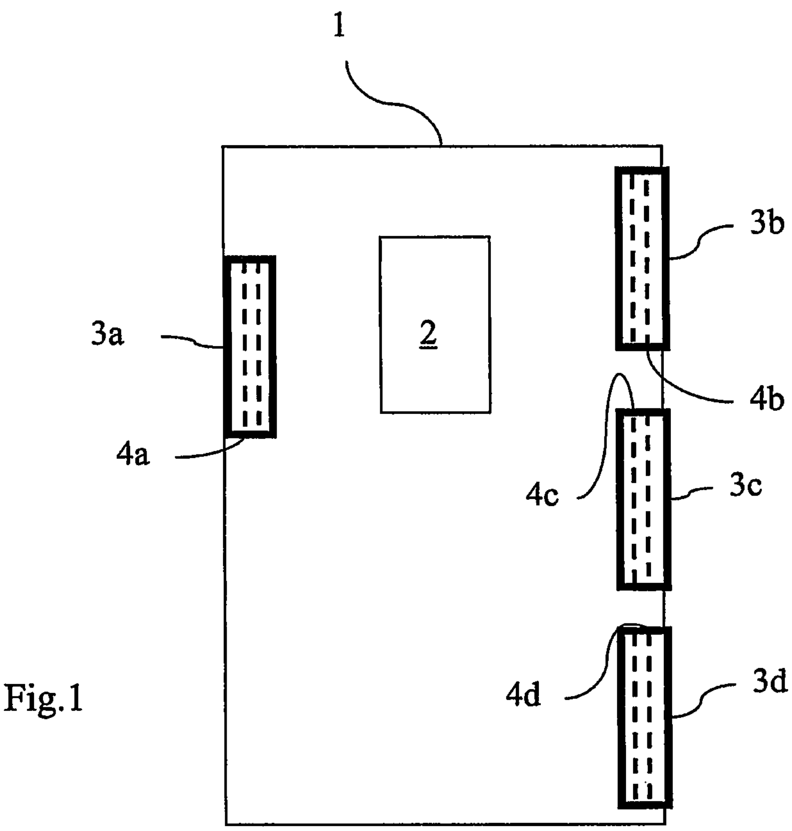
FIG. 1 schematically illustrates a conventional Ethernet switch.

FIG. 1 is a block diagram illustrating a conventional, exemplary Ethernet switch 1 having a MAC table 2 for storing the associations between MAC addresses and the interfacing ports of the switch. The switch 1 is further provided with four interfacing ports 3*a-d*, each provided with an output queuing buffers 4*a-d* for queuing and scheduling the outgoing traffic with different priority.

Figure 2:
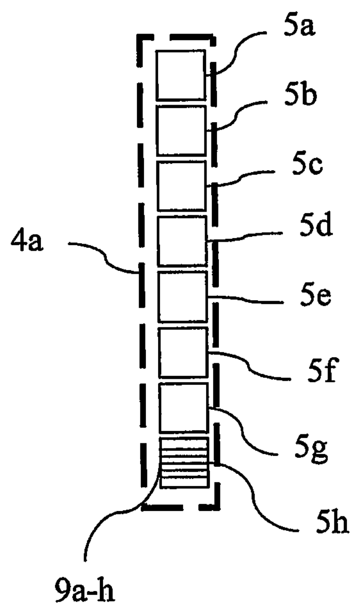
FIG. 2 schematically illustrates the output buffers of an interfacing port of an Ethernet switch.

FIG. 2 illustrates schematically the function of the output buffer 4*a* of a port, the buffer logically divided into one separate priority buffer, 5*a-h*, for each one of the eight classes of priorities, of which 5*a* indicates the buffer for traffic with the highest priority and 5*b*-5*h* indicates the buffers for traffic with lower priority. According to this invention, one of the priority buffers is arranged to function as a flooding buffer 5*h* for the packets having an unknown destination, for which no association to an interfacing port is stored in the MAC table 2. The traffic in the flooding buffer 5*h* is scheduled as low-priority traffic, and preferably as traffic having the lowest priority. Thus, each one of the priority buffers 5*a-h* queues traffic with the same priority, e.g. IP-TV in one queue and VoIP in another queue, both normally transported as high-priority traffic.

According to a first embodiment of this invention, a received unicast packet with an unknown destination is logically queued in the flooding buffer 5*h*, in which the traffic is scheduled as low-priority traffic, and preferably with the lowest priority.

According to a second embodiment of this invention, a received unicast packet with an unknown destination is queued in the flooding buffer 5*h*, and further scheduled within the flooding buffer into one of the logically separated priority flooding buffers, 9*a-h*, according to its traffic priority regarding the Quality of Service.

Figure 3:
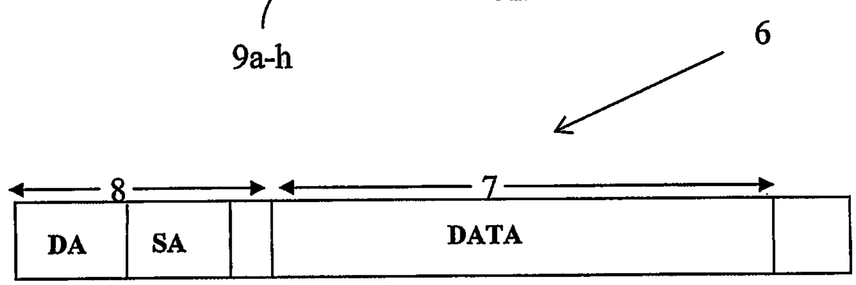
FIG. 3 illustrates an Ethernet packet.

FIG. 3 illustrates an Ethernet packet 6, having a data field 7 and a header 8, the header comprising a source address field, SA, and a destination address field, DA, as well as a field for the Class of Service indicating the priority of the data traffic. The setting of the Class of Service determines the priority buffer 5*a-h* for the outgoing traffic in the interfacing port 3*a-d* associated with the destination address, which is found in the MAC Table in the switch. The switch updates the MAC table by storing the association between the source address of a received Ethernet packet and the incoming port for said packet.

Figure 4:
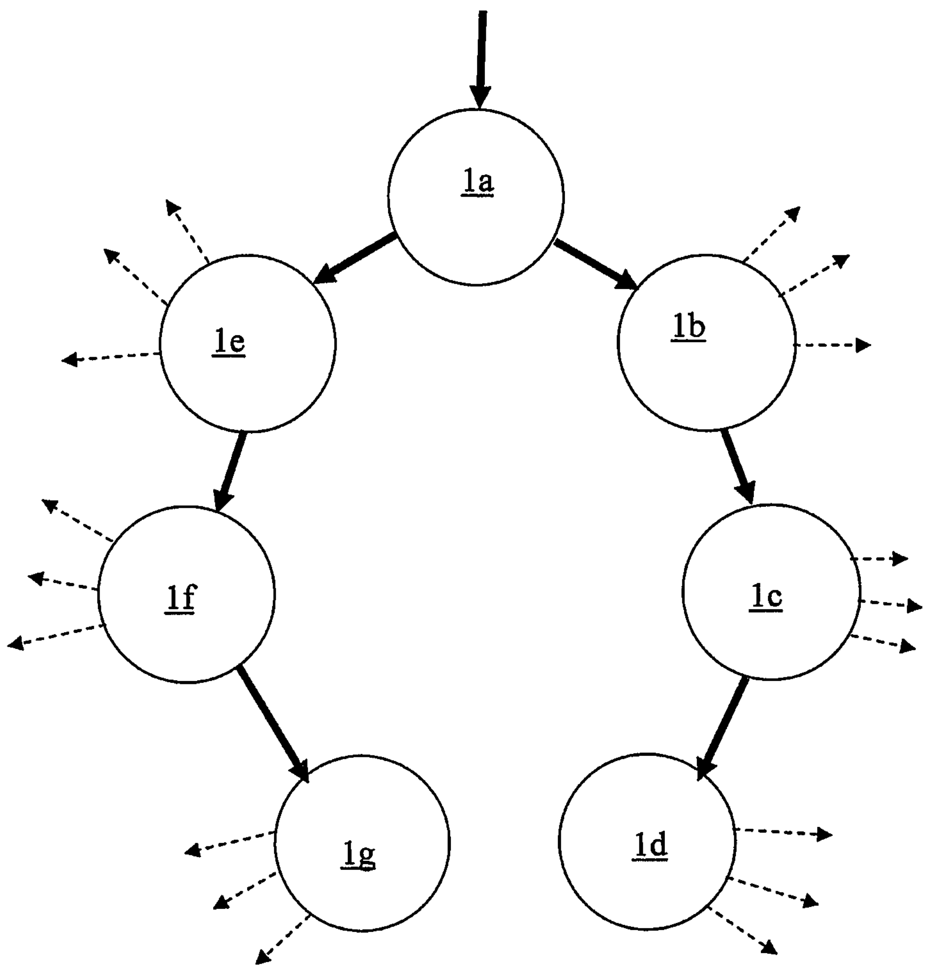
FIG. 4 illustrates a ring of Ethernet switches.
Figure 5:
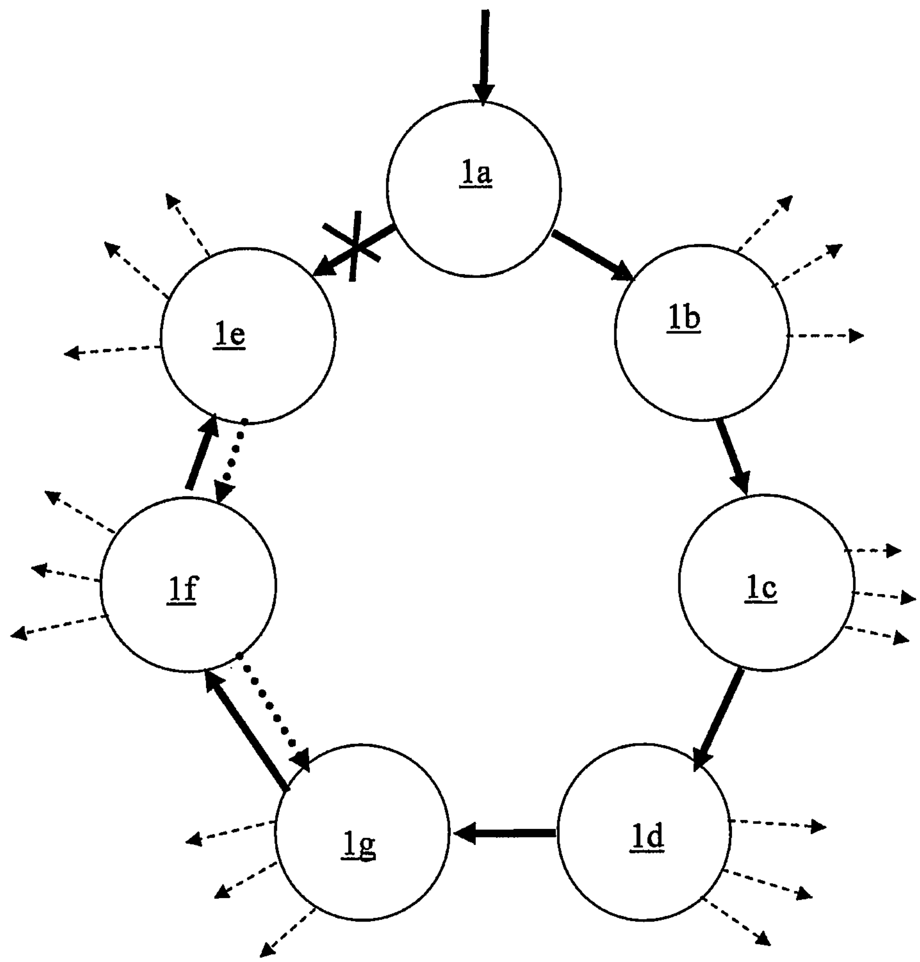
FIG. 5 illustrates the data traffic in the ring of FIG. 4, in case of a link failure.

The FIGS. 4 and 5 illustrate how flooding may occur, and FIG. 4 illustrates a “ring” of Ethernet switches 1*a-e*, interconnected by logical links, each ring connecting several segments with communication devices, each segment indicated by a hatched arrow, the switches and communication devices forming a large Ethernet network.

An Ethernet ring controlled by the EAPS has one designated Master node, 1*a*, controlling the traffic flow between the nodes, and one or more passive Transit nodes, each node having two physical ports connected to the ring. If any of the logical links between two switches, i.e. nodes, is interrupted, the traffic to the communication devices connected to the switches will be redirected according to the EAPS, or another protocol such as e.g. the RSTP (Rapid Spanning Tree Protocol), and the MAC tables associated with the ports in the ring of the switches will be flushed. This will lead to a greatly increased flooding of unicast packets with unknown addresses until updated MAC tables are created, since no association between the destination addresses and the ports will be found.

FIG. 5 illustrates the "ring" according to FIG. 4, in which a link failure has occurred between a first switch 1*a* and a second switch 1*e*. The protocol, e.g. the EAPS or the RSTP, will initiate a recovery procedure by activating a new logical link between the switches 1*d* and 1*g*. Thereby, the direction of the traffic between the switches 1*g* and 1*f*, and between 1*f* and 1*e*, will be reversed. As a consequence, the topology is changed, and the MAC tables in the switches for the associated ports will be flushed, leading to flooding of the unicast packets.

Figure 6:
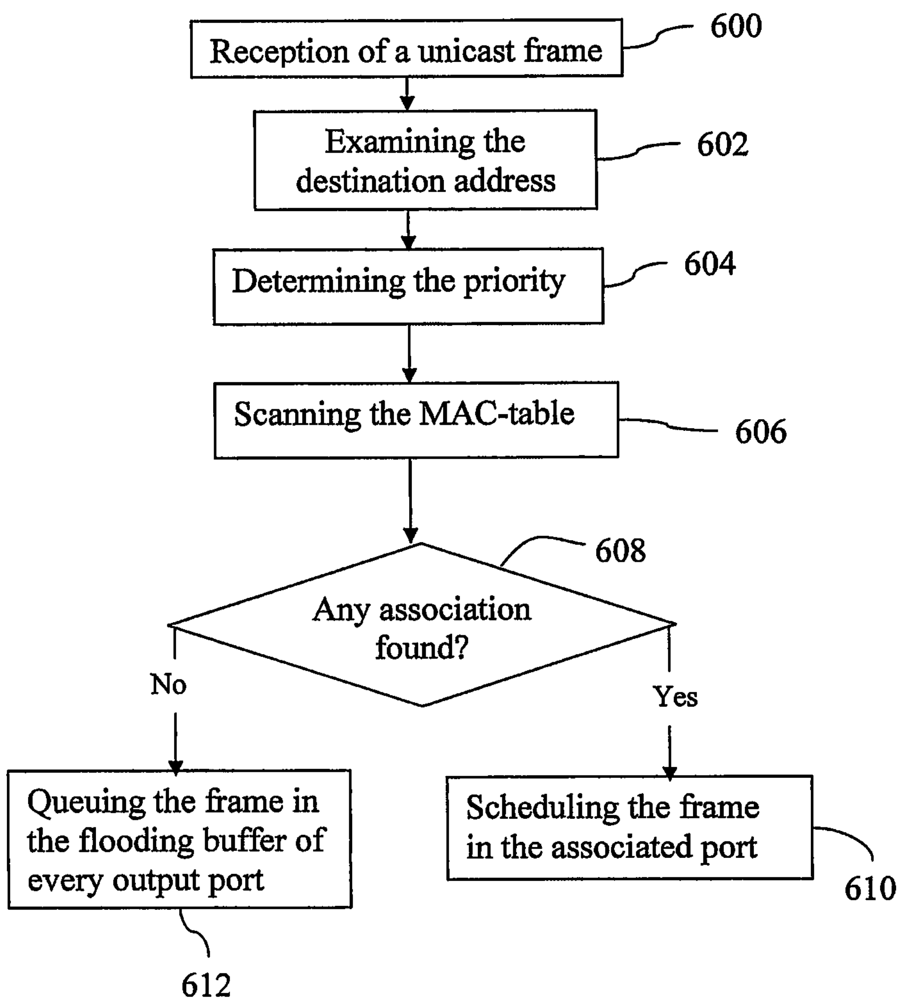
FIG. 6 is a flow chart of a procedure for handling a packet with unknown destination address according to a first embodiment of the invention.

The solution to the problem with flooding of packets having an unknown destination, according to this invention, involves queuing these packets as low-priority traffic, or as traffic having the lowest priority, in every outgoing port of the switch, and this solution is illustrated in FIG. 6.

FIG. 6 shows a flow chart of a procedure of handling a received unicast packet 6 with unknown destination address according to a first embodiment of the invention. In a first step 600, the switch 1 receives a unicast packet 6 through an incoming interfacing port 3*a*. In a next step 602, it examines the destination address in the header of the packet, extracting the MAC address, and in step 604, it determines the priority based on the Class of Service setting in the packet. In the next step 606, it scans the MAC table 2 to see if any association is stored between the MAC address of the received packet and an interfacing port 3*a-d* of the switch. If an association between the MAC address and one of the port 3*d* is found in the determination step 608, the switch schedules and queues the packet in step 610 in one of the logically separate priority buffers 5*a-h* of the output buffer 4*d* in only this port 3*d*, according to the priority of the packet, unless the associated port corresponds to the incoming port 3*a*, since in this case the communication device has already received the data. If no association to any port is found in the determination step 608, the switch performs flooding by scheduling and queuing the packet in the output buffer 4*b-d* of every outgoing port 3*b-d* of the switch, the queuing involving storing the packet logically in the specific flooding buffer 5*h* in the output buffers 4*b-d* in every outgoing port 3*b-d*. The traffic in the flooding buffer will be scheduled as low-priority traffic in relation to the other traffic through the switch, and preferably, but not necessarily, as traffic having the lowest priority.

According to a second embodiment of the invention, the flooding involves the additional step of queuing a unicast packet, having and unknown destination, in the flooding buffers 5*h* of every outgoing port according to the priority indicated in the Class of Service in the Ethernet packet, as determined in step 604, i.e. in logically separate priority flooding buffers 9*a-h*.

Alternatively, a unicast packet having an unknown destination may be queued according to its priority in another pre-determined priority buffer, 5*a-e*, and not in the flooding buffer 5*h*.

Figure 7:
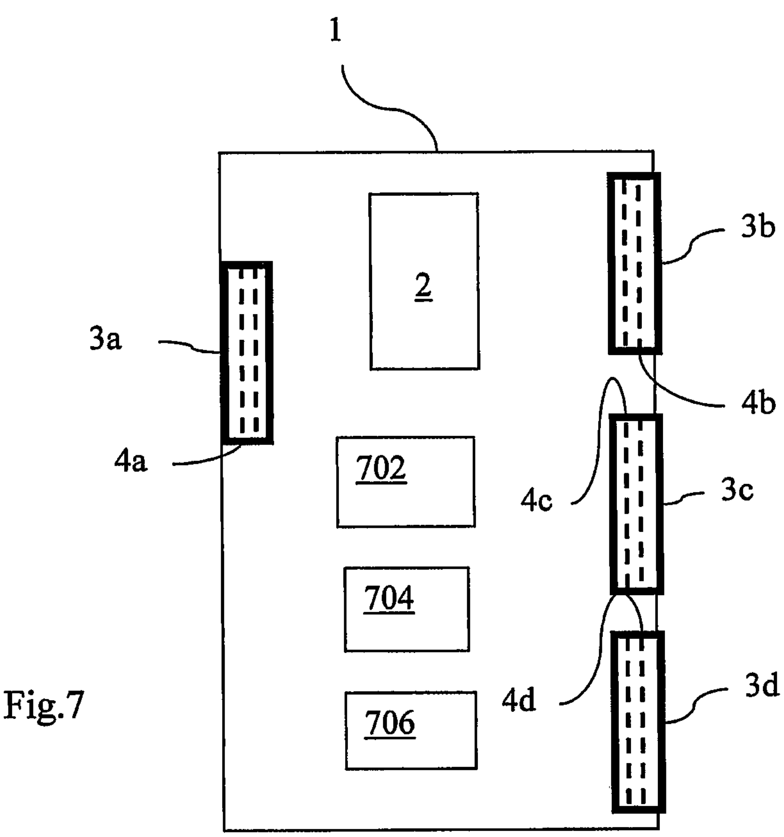
FIG. 7 illustrates an Ethernet switch provided with an arrangement for handling received unicast packets, according to a first embodiment of the invention.

FIG. 7 shows an Ethernet switch, as illustrated in FIG. 1, further provided with logical units according to an exemplary embodiment of an Ethernet switch capable of handling received Ethernet unicast packets 6 with unknown MAC addresses, i.e. when no interfacing port is associated with the destination address in the MAC table 2, the logical units implemented by a suitable combination of hardware and software according to common general knowledge of the skilled person within this technical field.

The switch is provided with an arrangement 702, 704, 706 comprising a determination unit 702 for determining the destination address and the traffic priority of the packet and a search unit 704 for finding an association between said destination address and an interfacing port of the switch. The arrangement further comprises a scheduling unit 706 for queuing and scheduling the packet in one of the priority buffers 5*a-h* in the output buffer 4 of the associated interfacing port 3 according to its traffic priority. However, when no stored association can be found in the MAC table 2, the packet is queued in the specific, pre-determined logical flooding buffer 5*h* in the output buffer 4 of every outgoing port 3 of the switch, said flooding buffer scheduling low-priority traffic, or preferably traffic having the lowest priority.

Thus, the invention according to the described embodiments provides a more efficient handling of received Ethernet unicast packets having a destination address that is unknown to the switch, thereby reducing the problems caused by overloaded downlink ports during conventional unicast flooding, which is especially disturbing in high-priority data traffic, such as IP-TV and VoIP.

While the invention has been described with reference to specific exemplary embodiments, the description is in general only intended to illustrate the inventive concept and should not be taken as limiting the scope of the invention.

The invention claimed is:

1. A scheduler for scheduling and queuing received unicast packets within an Ethernet switch, the Ethernet switch having two or more interfacing ports, each interfacing port being provided with an output buffer logically divided into different priority buffers, and having a processor coupled to a non-transitory memory device for storing computer program instructions, wherein when the processor executes the computer program instructions the scheduler is caused to:

determine a destination address and a traffic priority of a received unicast packet;

search for a stored association between the destination address and an interfacing port of the Ethernet switch;

when a stored association is found, schedule and queue the received unicast packet in one of the priority buffers of the output buffer in an associated interfacing port according to the received unicast packet's traffic priority; and when no association is found, flood the received unicast packet in a flooding buffer in every interfacing outgoing port of the Ethernet switch, and schedule the flooded unicast packet for transmission through each of the interfacing outgoing ports according to the flooded unicast packet's traffic priority after packets for which an association was found are transmitted.

2. The scheduler according to claim 1, wherein the traffic priority of the received unicast packet corresponds to the priority indicated by the Ethernet Class of Service (CoS) in the Ethernet packet.

3. The scheduler according to claim 1, wherein the destination address in the received unicast packet indicates the Media Access Control (MAC) address of a destination device.

4. The scheduler according to claim 3, further comprising an interface to a MAC table that stores associations between the MAC address and an interfacing port.

5. The scheduler according to claim 1, wherein the unicast packet is received through an incoming port, and the scheduler is configured to queue the unicast packet in flooding buffers in every interfacing port of the switch except the incoming port.

6. A method in an Ethernet switch for scheduling and queuing received Ethernet unicast packets, the Ethernet switch having two or more interfacing ports, each interfacing port being provided with an output buffer logically divided into different priority buffers, the method comprising the steps of:

determining a destination address and a traffic priority of a received unicast packet;

searching for a stored association between the destination address and any of the interfacing ports of the Ethernet switch;

when a stored association is found, scheduling and queuing the unicast packet in one of the priority buffers of the output buffer in the associated interfacing port according to the unicast packet's traffic priority; and when no association is found, flooding the received unicast packet in a flooding buffer in every interfacing outgoing port of the Ethernet switch, and schedule the flooded unicast packet for transmission through each of the interfacing outgoing ports according to the flooded unicast packet's traffic priority after packets for which an association was found are transmitted.

7. The method according to claim 6, wherein the traffic priority of the received unicast packet corresponds to the priority indicated by the Ethernet Class of Service (CoS) in the Ethernet packet.

8. The method according to claim 6, wherein the destination address in the received unicast packet indicates the Media Access Control (MAC) address of a destination device.

9. The method according to claim 8, wherein an association between the MAC address and an interfacing port is stored in a MAC table in the Ethernet switch.

10. The method according to claim 6, wherein the unicast packet is received through an incoming port, and the step of flooding the unicast packet includes queuing the packet in a flooding buffer in every interfacing port of the switch except the incoming port.

11. A method in an Ethernet switch for scheduling and queuing received Ethernet unicast packets, the Ethernet switch having two or more interfacing ports, each interfacing port being provided with an output buffer logically divided into different priority buffers, the method comprising the steps of:

determining a destination address and a traffic priority of a received unicast packet;

searching for a stored association between the destination address and any of the interfacing ports of the switch;

when an association is found, scheduling and queuing the packet in one of the priority buffers of the output buffer in the associated interfacing port according to the packets traffic priority; and when no association is found:

flooding the unicast packet by queuing the unicast packet in a flooding buffer in every interfacing port of the switch, wherein each flooding buffer is further logically divided into different priority flooding buffers for scheduling and queuing the flooded unicast packet according to the flooded unicast packets traffic priority, wherein each flooded unicast packet is prioritized in relation to other flooded unicast packets based on each flooded unicast packets traffic priority; and scheduling the flooded unicast packet for transmission through each of the interfacing outgoing ports according to the flooded unicast packet's traffic priority after packets for which an association was found are transmitted.

12. The method according to claim 11, wherein the traffic priority of the received unicast packet corresponds to the priority indicated by the Ethernet Class of Service (CoS) in the Ethernet packet.

13. The method according to claim 11, wherein the destination address in the received unicast packet indicates the Media Access Control (MAC) address of a destination device.

14. The method according to claim 13, wherein an association between the MAC address and an interfacing port is stored in a MAC table in the Ethernet switch.

15. The method according to claim 11, wherein the unicast packet is received through an incoming port, and the step of flooding the unicast packet includes queuing the packet in a flooding buffer in every interfacing port of the switch except the incoming port.

* * * * *

UNITED STATES PATENT AND TRADEMARK OFFICE

CERTIFICATE OF CORRECTION

PATENT NO. : 8,416,795 B2
APPLICATION NO. : 13/479475
DATED : April 9, 2013
INVENTOR(S) : Thyni It is certified that error appears in the above-identified patent and that said Letters Patent is hereby corrected as shown below:

In the Specifications

In Column 3, Line 21, delete "do" and insert -- to --, therefor.

In Column 4, Line 12, delete "phase" and insert -- phase. --, therefor.

In the Claims

In Column 8, Line 47, in Claim 1, delete "instructions" and insert -- instructions, --, therefor.

In Column 10, Lines 13-14, in Claim 11, delete "packets" and insert -- packet's --, therefor.

In Column 10, Line 21, in Claim 11, delete "packets" and insert -- packet's --, therefor.

In Column 10, Line 24, in Claim 11, delete "packets" and insert -- packet's --, therefor.

Signed and Sealed this
Sixteenth Day of July, 2013

Teresa Stanek Rea
*Acting Director of the United States Patent and Trademark Office*